United States Patent
Taki et al.

(10) Patent No.: US 6,477,605 B1
(45) Date of Patent: *Nov. 5, 2002

(54) APPARATUS AND METHOD FOR CONTROLLING DEVICE CONNECTION

(75) Inventors: Nobuhiro Taki; Hideo Makabe; Masato Tomita, all of Kasugai (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/262,007

(22) Filed: Mar. 4, 1999

(30) Foreign Application Priority Data

Aug. 21, 1998 (JP) .......................... 10-235597

(51) Int. Cl.[7] ............................ G06F 13/00; G06F 1/26
(52) U.S. Cl. ...................................... 710/302; 713/310
(58) Field of Search ................................ 710/302, 104; 713/100, 300, 310, 320, 340; 709/217, 218, 224, 229

(56) References Cited

U.S. PATENT DOCUMENTS

5,790,876 A 8/1998 Shima et al.
6,026,494 A * 2/2000 Foster ........................ 713/320

FOREIGN PATENT DOCUMENTS

| JP | 57-150058 | 9/1982 |
|----|-----------|--------|
| JP | 61-117629 | 6/1986 |
| JP | 1-251148 | 10/1989 |
| JP | 6-164780 | 6/1994 |
| JP | 10-070561 | 3/1998 |

* cited by examiner

Primary Examiner—Glenn A. Auve
(74) Attorney, Agent, or Firm—Arent Fox Kintner Plotkin & Kahn, PLLC

(57) ABSTRACT

A connection device for connecting electronic devices via a network allows activates its status signal in response to a data transfer operation or in response to receiving a remote status signal. By limiting the activation of the status signal, the connection device reduces the power consumption of the electronic devices. The connection device also performs plug-and-play initialization to prevent device conflicts and allow for hot plug-in of electronic devices.

28 Claims, 12 Drawing Sheets

- Conditions where a local status signal is activated 1-1. An activate remote status signal is detected
  1-2. A local node sends and receives data over a net

- Condition where a local status signal is deactivated 2-1. An inactivate remote status signal is detected

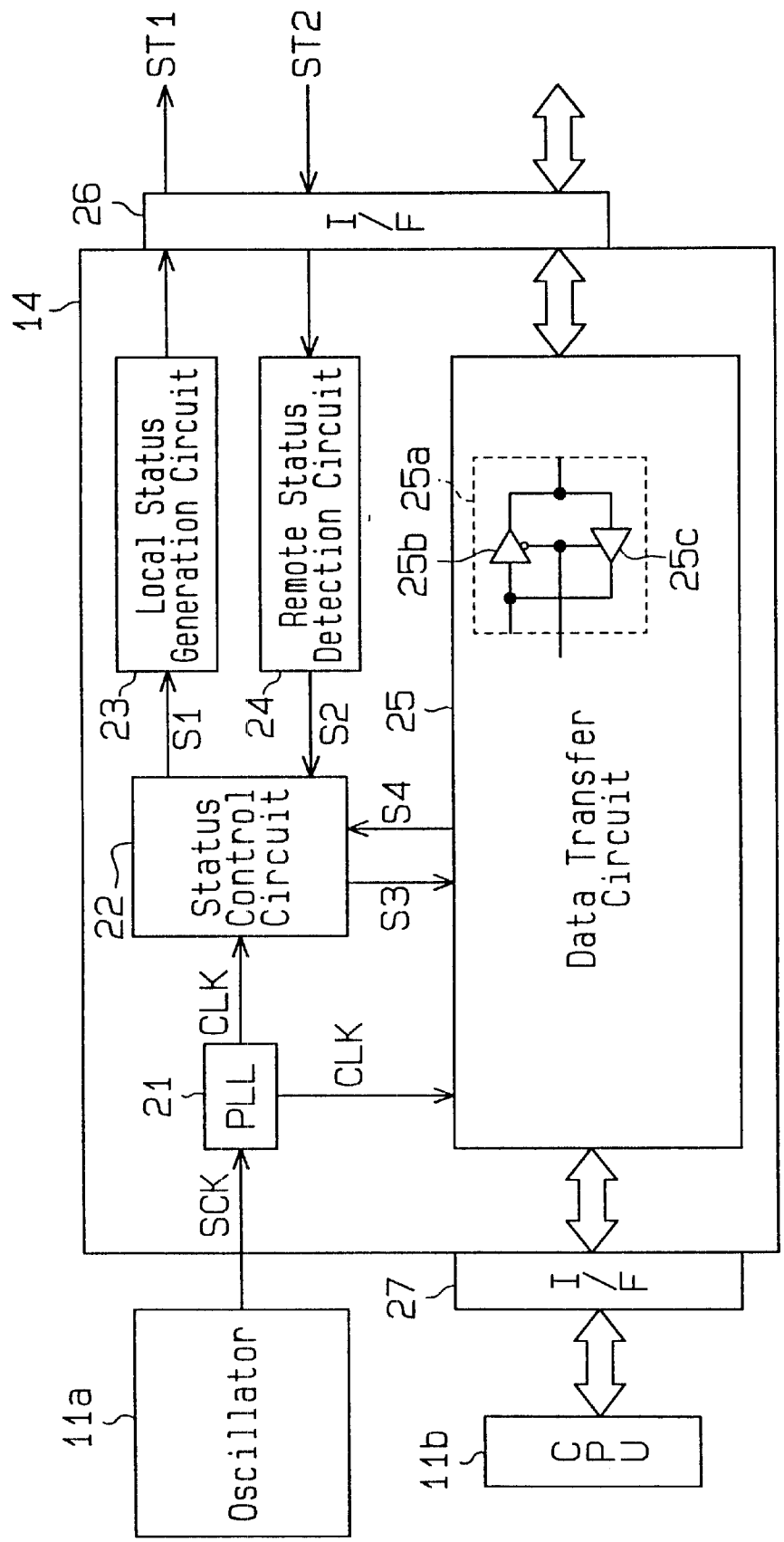

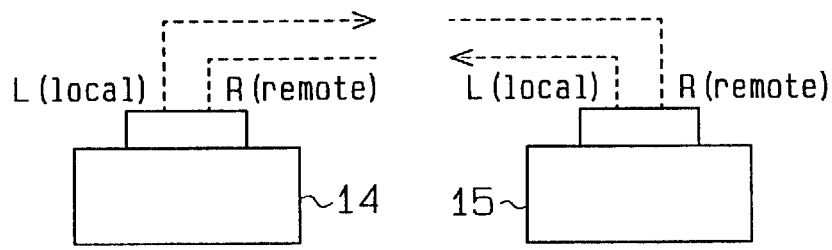
Fig.4(a)  In Non-connected State
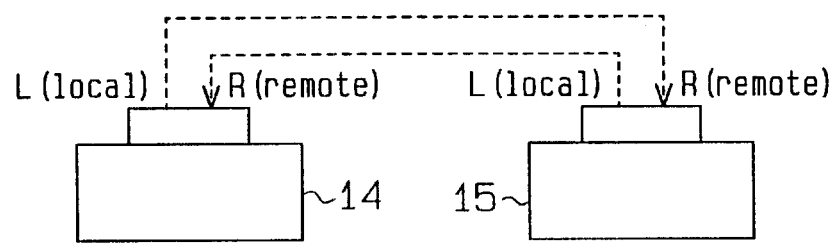
Fig.4(b)  In Connected State
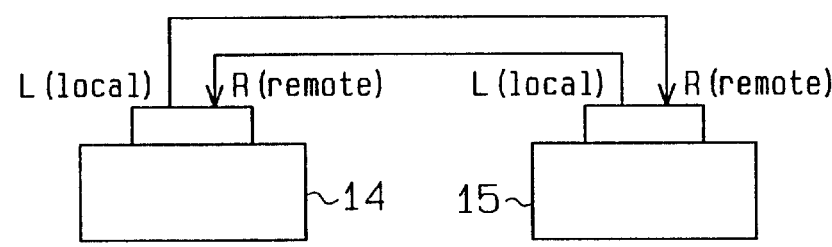
Fig.4(c)  During Data Transfer
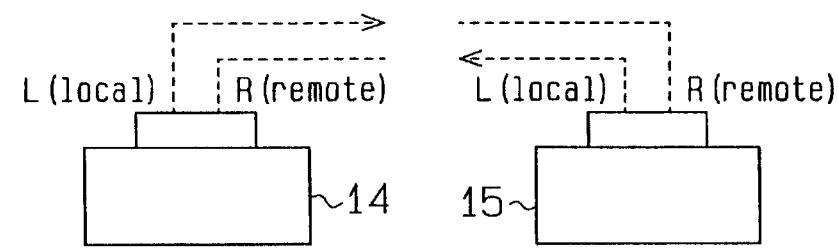
Fig.4(d)  In Non-connected State (Disconnected State)

Fig.5(a) In Non-connected State
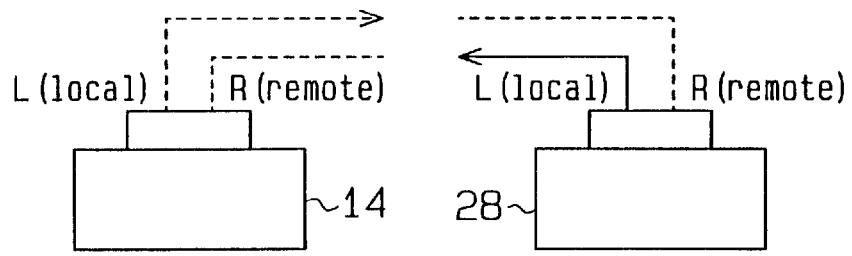
Fig.5(b) In Connected State
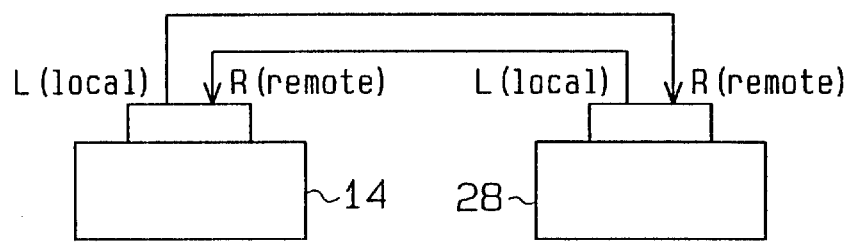
Fig.5(c) During Data Transfer
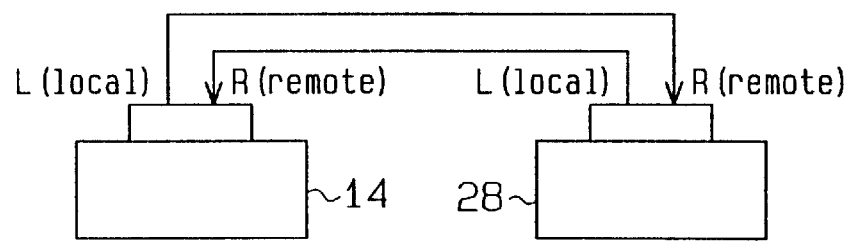
Fig.5(d) In Non-connected State (Disconnected State)
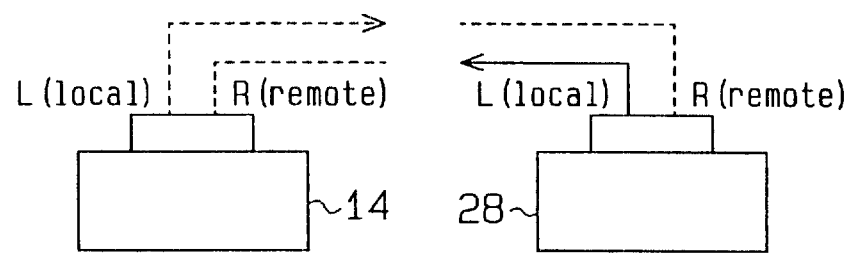

Fig.6

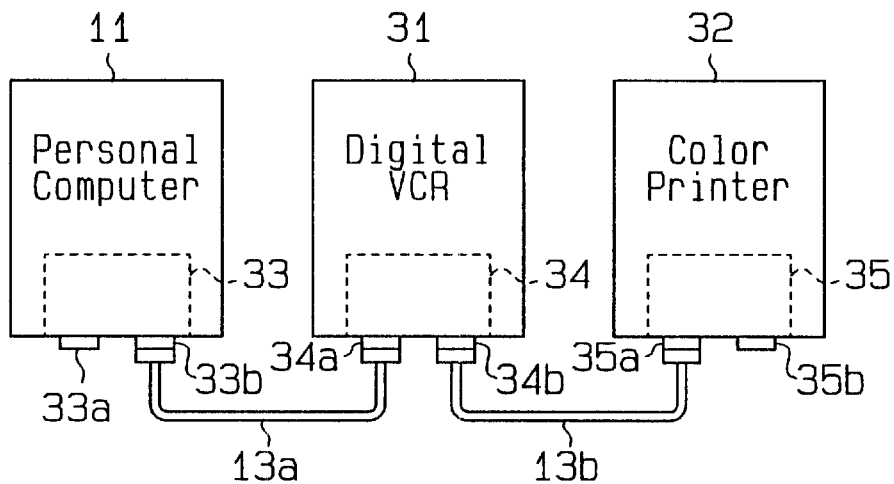

Fig.7

- Conditions where a local status signal is activated 1-1. An activate remote status signal is detected in one or more node
  1-2. A local node is sending or receiving data over a net
  1-3. A local status signal is deactivated to ignore interference from the net, and the condition where interference is to be ignored is terminated

- Conditions where a local status signal is deactivated 2-1. The remote status signal is deactivated
  2-2. Interference from the net is ignored

APPARATUS AND METHOD FOR CONTROLLING DEVICE CONNECTION

BACKGROUND OF THE INVENTION

The present invention generally relates to a method and apparatus for controlling a device connection, and, more particularly, to a method and apparatus for controlling the connecting of devices to a network or host device, such as a personal computer.

When connecting a peripheral device to a host device or a network, such as connecting a digital video camera to a personal computer, the peripheral device is usually connected to the host device while the host device power is turned off. This is because a personal computer does not recognize a device if the device is connected to the computer after the power has been turned on.

It is desirable to be able to connect a device to a network or host device while the network or host device is powered on. This is called hot plug-in or hot swapping. It is also desirable that the peripheral device and the host device be able to communicate without encountering any device conflicts. A device conflict occurs when more than one device attempts to use the same device address. A standard, known as plug-and-play, allows compliant peripheral devices to be connected to a host and the host detects connected devices and assigns an address or identifier to each peripheral device to avoid device conflicts.

The key issue for hot plug-in and plug-and-play is always to recognize whether the device has been connected to the network. Generally, the device has a cable connection controller (connection device) for connecting to the network. The device can also be connected to the network through an external connection device. The connection device outputs a status signal indicating the presence of the device to a connection terminal of the network. The status signal has a predetermined bias voltage.

All of the devices connectable to the network are constructed to output the status signal. Plural devices connected to the network mutually detect the status signal output from a remote device so that the network may be reconstructed. Thus, the device recognizes whether the remote device is connected to the network by detecting the remote status signal. This recognition of the remote device enables data to be transferred between the devices or between the device and the personal computer.

However, the devices always outputs the status signal even when in the connected state. In other words, the device outputs the status signal even when there is no need to connect to the network. Hence, a circuit that outputs the status signal operates at any time, which increases the power consumption of the device.

It is an object of the present invention to provide a device connection control apparatus and method that reduce the power consumption.

SUMMARY OF THE INVENTION

In one aspect of the present invention, a connection control apparatus is provided that controls a connection between a local node and a remote node by sending and receiving a status signal therebetween. The apparatus includes a status generation circuit generating a local status signal and a status detection circuit for receiving a remote status signal generated at the remote node and for detecting a state of the received remote status signal. A status control circuit is connected to the status generation circuit and the status detection circuit and selectively controls the status generation circuit. The status control circuit disables the status generation circuit when the detected state of the remote status signal denotes deactivation and enables the status generation circuit when either the local node starts sending and receiving data with the remote node or the detected state of the remote status signal denotes activation.

In another aspect of the present invention, a method is provided that controls a connection between a local node and a remote node by sending and receiving a status signal therebetween. The local node and the remote node each is connected to a connection control apparatus. Each connection apparatus includes a status generation circuit for generating a local status signal and a status detection circuit for detecting a remote status signal generated by the status generation circuit of the connection controller of the remote node. First, the status generation circuit is disabled when deactivation of the remote status signal is detected by the status detection circuit. Then, the status generation circuit is enabled when the local node starts sending and receiving data with the remote node or when activation of the remote status signal is detected.

In yet another aspect of the present invention, a connection device is provided that connects an electronic device to a remote device via a network. The connection device includes a net interface circuit connected to a network for transmitting a local status signal over the network and for receiving a remote status signal transmitted over the network. A local status generation circuit is connected to the net interface circuit. The local status generation circuit generating the local status signal in response to a control signal. A remote status detection circuit is connected to the net interface circuit. The remote status detection circuit detects a remote status signal received by the net interface circuit. In response to detecting the remote status signal, the remote status detection circuit activates a detection signal. A host interface circuit is connected to the electronic device, passes data to the electronic device, and receives data from the electronic device. A data transfer circuit is connected between the host interface circuit and the net interface circuit, passes data therebetween, and generates a data transfer control signal indicating that data is to be transferred between the remote device and the electronic device. A status control circuit is connected to the local status generation circuit for providing the control signal thereto, connected to the remote status detection circuit for receiving the remote status signal, and connected to the data transfer circuit for receiving a data transfer control signal therefrom. The status control circuit activates the control signal in response to the data transfer control signal or the detection signal.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best understood by reference to the following description of the presently preferred embodiments together with the accompanying drawings in which:

FIG. 3 is a schematic block diagram of the connection device according to a first embodiment of the present invention;

FIGS. 4(a) to 4(d) are diagrams explaining the operation of the connection device of FIG. 3;

FIGS. 5(a) to 5(d) are diagrams explaining the operation of the connection device of FIG. 3 and a conventional connection device;

FIG. 6 is a schematic block diagram of a connection device according to a second embodiment of the present invention;

FIG. 7 shows the control conditions of a status signal generated by the connection device of FIG. 6;

DETAILED DESCRIPTION OF THE PREFERRED EMBODIMENTS

Figures 1, 2:
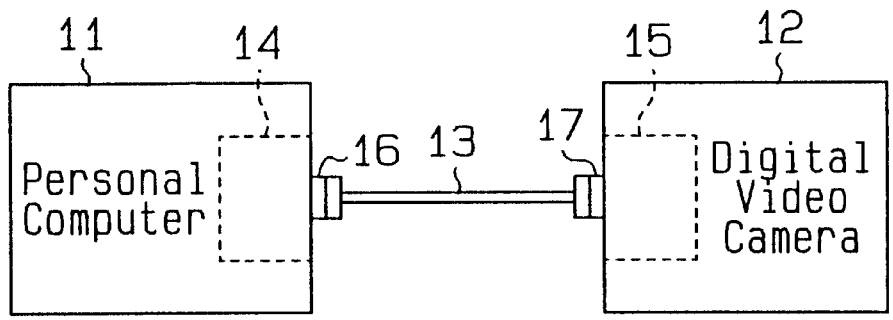
FIG. 1 is a schematic block diagram according to a first embodiment of the present invention.
FIG. 2 shows the control conditions of a status signal generated by a connection device of the system of FIG. 1.

In the drawings, like numerals are used for like elements throughout.

First Embodiment

FIG. 1 is a schematic diagram of a system configuration according to a first embodiment of the present invention that complies with the IEEE1394 serial interface standard. In FIG. 1, a first device, namely a personal computer 11 is connected to a second device, such as a digital video camera 12 via a cable 13. The personal computer 11 and the camera 12 form a network that sends and receives data in accordance with the IEEE1394 standard. However, as will be apparent, compliance with IEEE1394 is not required and a connection configuration other than that of the IEEE1394 standard may be employed.

The personal computer 11 and the camera 12 include respective cable connection controllers 14 and 15 (hereinafter referred to as connection devices) for enabling the transfer of data that conforms to the IEEE1394 protocol. The connection devices 14 and 15 have connectors 16 and 17, respectively, to which opposing ends of the cable 13 are connected.

The connection devices 14 and 15 implement plug-and-play and allow hot plug-in. The connection devices 14 and 15 recognize whether the devices 11 and 12 are connected to the network by sending and receiving a status signal between the devices 11 and 12. Each of the connection devices 14 and 15 generates a status signal, i.e., a local status signal and supplied it to the other (remote) connection device. Each of the connection devices also detects a status signal from the other (remote) connection device. That is, each device generates a local status signal and detects a remote status signal.

The connection devices 14 and 15 activate and/or deactivate generation of the local status signal in accordance with predetermined conditions. FIG. 2 shows the conditions in which the connection devices 14 and 15 active or inactive the local status signal. Hereupon, the personal computer 11 and the camera 12 are also referred to as nodes. Further, when the personal computer 11 checks the state of the network, the personal computer 11 is the local node and the camera 12 is the remote node.

The local node activates its local status signal when either of the following conditions 1-1 and 1-2 is satisfied.

Condition 1-1: The local node receives an activate remote status signal from the remote node and detects the remote status signal, or Condition 1-2: The local node sends and receives data over the network.

The local node deactivates its local status signal when the following condition 2-1 is satisfied.

Condition 2-1: The local node detects that a remote status signal is deactivated.

The connection devices 14 and 15 do not generate activate local status signals when the personal computer 11 and the camera 12 are not connected together (i.e., used separately). Accordingly, the power consumption of the circuit that generates and outputs the local status signal is reduced. As a result, the power consumption of the connection devices 14 and 15, that is, the personal computer 11 and the camera 12, is reduced.

FIG. 3 is a schematic block diagram of the connection device 14. The connection device 15 preferably has the same configuration as the connection device 14.

The connection device 14 includes a PLL circuit 21, a status control circuit 22, a local status generation circuit 23, a remote status detection circuit 24, a data transfer circuit 25, a net interface 26, and a host interface 27. The personal computer 11 is equipped with an oscillator 11a that generates a reference clock signal SCK and a CPU 11b.

The PLL circuit 21 receives the reference clock signal SCK from the oscillator 11a and generates a clock signal CLK having a higher frequency than that of the reference clock signal SCK. The status control circuit 22 and the data transfer circuit 25 operate in accordance with the clock signal CLK supplied from the PLL circuit 21.

The status control circuit 22 is connected to the local status generation circuit 23 and the remote status detection circuit 24. The remote status detection circuit 24 is connected to the remote connection device (connection device 15 of the camera 12) via the net interface 26. The remote status detection circuit 24 receives a remote status signal ST2 supplied from the connection device 15 through the network (cable 13).

The remote status detection circuit activates a detection signal S2 in response to an activated remote status signal ST2. The status control circuit 22 receives the activated detection signal S2 from the remote status detection circuit 24 and activates a control signal S1. The local status generation,circuit 23 receives the activated control signal S1 from the status control circuit 22 and activates a local status signal ST1. The activated local status signal ST1 is supplied to the connection device 15. Thus, the status control circuit 22 activates the local status signal ST1 in response to the detection signal S2 of the activated remote status signal ST2.

The remote status detection circuit 24 deactivates the detection signal S2 when it detects that remote status signal is inactive. The status control circuit 22 receives the inactivate detection signal S2 from the remote status detection circuit 24 and deactivates the control signal S1. The local status generation circuit 23 receives the inactivate control signal S1 from the status control circuit 22 and deactivates the local status signal ST1. Thus, the status control circuit 22 deactivates the local status signal ST1 in response to the remote status signal ST2 being inactive.

The status control circuit 22 further activates a signal S3 in response to the activated detection signal S2. The signal S3 is supplied to the CPU 11b through the data transfer circuit 25 and the host interface 27. The CPU 11b detects the state of the network using the signal S3. At this time, since the remote status signal ST2 is activate, the connected device is in the activate state. Thus, by detecting the state of the network, the personal computer 11 and the remote device form the network and enable data transfer. The status control circuit 22 may supply the detection signal S2 to the data transfer circuit 25 instead of the signal S3.

The data transfer circuit 25 includes a buffer circuit 25a comprising a driver 25b and a receiver 25c. The data transfer circuit 25 is connected to the CPU 11b through the host interface 27 and is connected to the connection device 15 of the camera 12 through the net interface 26.

The data transfer circuit 25 receives data from the CPU 11b through the host interface 27 and converts the data to a data format complying with the IEEE1394 standard. The formatted data is supplied to the remote connection device through the driver 25b and the net interface 26.

The data transfer circuit 25 further receives data from the network through the net interface 26 and the driver 25c and converts the data to a data format that can be handled by the CPU 11b. The formatted data is supplied to the CPU 11b through the host interface 27.

The data transfer circuit 25 generates a signal S4 indicating the start of data transfer prior to the data transfer from the CPU 11b and supplies the signal S4 to the status control circuit 22. The status control circuit 22 enables the local status generation circuit 23 to operate in response to the signal S4 and the local status generation circuit 23 activates the local status signal ST1. Thus, the status control circuit 22 activates the local status signal ST1 when data is to be transferred from the personal computer 11.

When the CPU 11b receives data, the CPU 11b first sends a receiving command to the camera 12. The camera 12 sends data in response to the receiving command. The data transfer circuit 25 supplies the signal S4 to the status control circuit 22 in response to the receiving command from the camera 12. Thus, the status control circuit 22 activates the local status signal ST1 when the personal computer 11 receives the data.

Next, the operation that occurs when connecting and disconnecting the personal computer 11 equipped with the connection device 14 to the camera 12 equipped with the connection device 15 is described.

FIGS. 4(a) to 4(d) are diagrams explaining the operation of the connection device. FIGS. 4(a) to 4(d) show the connection devices 14 and 15 and omit the personal computer 11 and the camera 12. Further, the active status signal is shown by a solid line and the inactive status signal is shown by a dotted line. Furthermore, the local status signal is shown as "L (local)" and the remote status signal is shown as "R (remote)".

In FIG. 4(a), the connection devices 14 and 15 are powered on and the connection devices 14 and 15 are in the non-connected state. In this case, the remote status signal is not supplied to the devices 14 and 15 (i.e., the remote status signal is in active). Accordingly, the devices 14 and 15 detect that the remote status signal is inactive and maintain the local status signal in the inactive state.

In FIG. 4(b), the connection devices 14 and 15 are connected together. At this time, the remote status signals are inactive. Hence, the devices 14 and 15 maintain the local status signal in the inactive state.

In FIG. 4(c), data is being transferred from the connection device 14 to the connection device 15. That is, data is transferred from the personal computer 11 to the camera 12 via the connection devices 14 and 15.

At this time, as shown in FIG. 4(c), the connection device 14 activates the local status signal. The connection device 15 receives the activated remote status signal from the connection device 14 and activates its local status signal and supplies it to the connection device 14 as the remote status signal. Thus, the connection devices 14 and 15 detect the mutually activated remote status signals, and the data is transferred from the connection device 14 to the connection device 15. When the data is transferred from the connection device 15 to the connection device 14, the devices 14 and 15 operate in the same manner as above.

In FIG. 4(d), when the connection between the connection devices 14 and 15 is broken, the supply of the remote status signal is interrupted. Accordingly, the devices 14 and 15 deactivate the local status signal.

As described above, the connection devices 14 and 15 activate the local status signal when they start the data transfer after they have been connected by the cable 13. Thus, the connection devices 14 and 15 provide for hot plug-in. The power consumption of the connection devices 14 and 15 is reduced in the non-connected state and from the time when cable 13 is connected until the time when data transfer is started.

FIGS. 5(a) to (d) are diagrams explaining the operation of the connection device 14 according to the first embodiment when the remote device has a conventional connection device 28.

As shown in FIG. 5(a), the connection device 14 and the conventional connection device 28 (hereinafter referred to as conventional device) are powered on, and both the devices 14 and 28 are in the non-connected state. At this time, the conventional device 28 always outputs the activated local status signal. However, no remote status signal is supplied to the connection device 14. Accordingly, the connection device 14 does not detect the remote status signal and maintains its local status signal in the inactive state.

Next, as shown in FIG. 5(b), the connection device 14 and the conventional device 28 are connected. Hereupon, the remote status signal from the conventional device 28 is supplied to the connection device 14. The connection device 14 detects the activated remote status signal and activates its local status signal. The conventional device 28 receives the activated remote status signal from the connection device 14. Thus, the connection device 14 and the conventional device 28 recognize the remote connection device by mutually detecting the activated remote status signals. Hence, the connection between the devices 14 and 28 is completed and the network is formed, thereby enabling data transfer.

Then, as shown in FIG. 5(c), during data transfer, because the connection device 14 and the conventional device 28 recognize each other, data can be transferred therebetween.

Subsequently, as shown in FIG. 5(d), when the connection between the connection device 14 and the conventional device 28 is broken, the supply of the remote status signal from the conventional device 28 to the connection device 14 is interrupted. Accordingly, the connection device 14 deactivates its local status signal.

The connection device 14, when connected to the conventional device 28, allows hot plug-in. The power consumption of the connection device 14 in the non-connected state is reduced. The connection device 14 also implements plug-and-play to allow the devices 14, 28 to communicate.

As shown above, according to the first embodiment, the following effects are obtained.

(1) The status control circuit 22 disables the operation of the local status generation circuit 23 when the remote status signal ST2 is inactive. As a result, the power consumption of the local status generation circuit 23 is reduced.

(2) The status control circuit 22 enables the operation of the local status generation circuit 23 when it detects the activate remote status signal ST2. As a result, in the hot plug-in state, the remote connection device connected to the network is recognized and plug-and-play formation of the network is implemented.

Second Embodiment

FIG. 6 is a schematic block diagram of system configuration according to a second embodiment of the present invention that complies with the IEEE1394 standard. The personal computer 11 and a digital VCR 31 are connected via a cable 13a and the digital VCR 31 and a color printer 32 are connected via a second cable 13b. The personal computer 11, VCR 31, and printer 32 form a network that sends and receives data in accordance with the IEEE1394 standard.

The personal computer 11, VCR 31, and printer 32 are equipped with cable connection controllers (hereinafter referred to as connection devices) 33, 34, and 35 which enable data transfer in accordance with the IEEE1394 protocol.

Each of the connection devices 33, 34, and 35 has two I/O ports, and the two I/O ports are provided with connectors 33a, 33b, 34a, 34b, 35a, and 35b, respectively. The cables 13a, 13b are connected to each of the connectors 33b, 34a, 34b, and 35a in a conventional manner. In FIG. 6, the cable 13a is connected between the connector 33b in the personal computer 11 and the connector 34a of the VCR 31. Further, the cable 13b is connected between the connector 34b in the VCR 31 and the connector 35a of the printer 32. According to such a connection, the personal computer 11, VCR 31, and printer 32 form a network and data transfer between the personal computer 11, VCR 31, and printer 32 is enabled.

Each of the connection devices 33 to 35 implements plug-and-play and allows hot plug-in. In other words, the connection devices 33 to 35 recognize whether the personal computer 11, VCR 31, and printer 32 are connected to the network by sending and receiving the status signal between the devices 33-35. The connection devices 33 to 35 generate their respective the status signals (hereinafter referred to as local status signals) and supply them to the remote connection devices and detect the status signals (hereinafter referred to as remote status signals) supplied from the remote connection devices.

Further, the connection devices 33 to 35 selectively activate and/or deactivate the local status signal in accordance with predetermined conditions. FIG. 7 shows the control conditions of the local status signals. Hereupon, the personal computer 11, VCR 31, and printer 32 are called nodes. The personal computer 11, which checks the state of the network, is called a local node, and the VCR 31 and the printer 32 are called remote nodes.

The local node activates its local status signal when any one of the following three conditions 1-1, 1-2, and 1-3 is satisfied.

Condition 1-1: An activate remote status signal from one of the remote nodes is detected;

Condition 1-2: The local node is sending or receiving data over the network; and Condition 1-3: In the case where the local status signal is inactivate to ignore interference from the network, an ignore-interference state is terminated.

The local node deactivates its local status signal when either of the following two conditions 2-1 and 2-2 is satisfied.

Condition 2-1: The remote status signal is inactive; and

Condition 2-2: The local node is in an ignore-interference from the network state or node.

The connection devices 33 to 35 deactivate the local status signal when the personal computer 11, VCR 31, and printer 32 are used separately. Hence, the power consumption of the circuit that generates the local status signal is reduced, and the power consumption of the devices 33 to 35, and the personal computer 11, VCR 31, and printer 32 are reduced accordingly.

Figure 8:
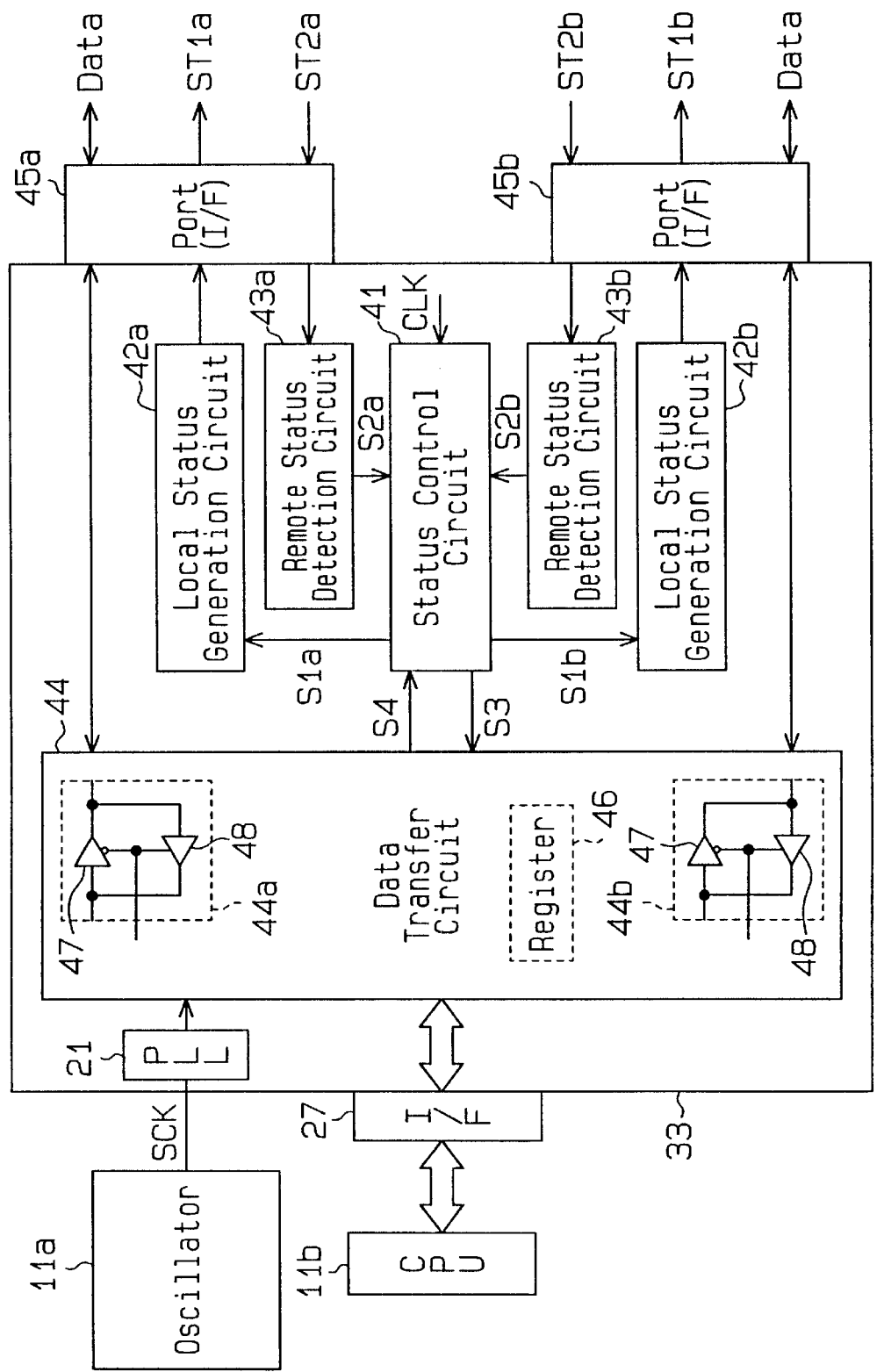
FIG. 8 is a more detailed schematic block diagram of the connection device of FIG. 6.

FIG. 8 is a schematic block diagram of the connection device 33 of the personal computer 11. The connection device 34 of the VCR 31 and the connection device 35 of the printer 32 have the same configuration and perform the same operation as the connection device 33.

The connection device 33 includes net interfaces 45a and 45b that correspond to the connectors 33a and 33b, a status control circuit 41, local status generation circuits 42a and 42b, remote status detection circuits 43a and 43b, a data transfer circuit 44, the PLL circuit 21, and the host interface 27.

The status control circuit 41 controls enable and/or disable of the operations of the local status generation circuits 42a and 42b. The data transfer circuit 44 converts the format of the data transferred between the CPU 11b and the device connected to the net interfaces 45a and 45b.

The PLL circuit 21 generates a clock signal CLK preferably having a higher frequency than a reference clock signal SCK in accordance with the reference clock signal SCK from the oscillator 11a and supplies the clock signal CLK to the status control circuit 41 and the data transfer circuit 44.

The remote status detection circuits 43a and 43b receive remote status signals ST2a and ST2b from connected devices via the network and activate detection signals S2a and S2b in response to the activated status signals ST2a and ST2b when the remote status signals ST2a and ST2b are in the active state. In the present example, net interface 45a is not connected to a remote device (FIG. 6). The status control circuit 41 activates control signals S1a and S1b in response to the activated detection signals S2a and S2b. The local status generation circuits 42a and 42b activate local status signals ST1a and ST1b in response to the activated control signals S1a and S1b from the status control circuit 41.

The remote status detection circuits 43a and 43b deactivate the detection signals S2a and S2b when they do not detect active status signals ST2a and ST2b, respectively. The status control circuit 41 deactivates the control signals S1a and S1b in response to the inactivate detection signals S2a and S2b. The local status generation circuits 42a and 42b disable their operations in response to the inactivate control signals S1a and S1b from the status control circuit 41. Accordingly, the local status signals ST1a and ST1b are inactive.

The status control circuit 41 activates the signal S3 in response to the activation of at least one of the detection signals S2a and S2b and supplies the signal S3 to the data transfer circuit 44. The signal S3 is used to detect the network state of the CPU 11b. When the signal S3 is activated, the personal computer 11 recognizes that a device in the activated state has been connected to the network and forms the network comprising the personal computer 11 and the device so as to enable data transfer. Instead of the signal S3, the detection signals S2a and S2b may also be supplied to the status control circuit 41.

The data transfer circuit 44 includes a register 46 and buffer circuits 44a and 44b that correspond to the net interfaces 45a and 45b. Each of the buffer circuits 44a and 44b preferably comprises a driver 47 and a receiver 48.

The data transfer circuit 44 receives data from the CPU 11b via the host interface 27 and converts the data to a data format that complies with the IEEE1394 standard. The format-converted data is supplied to the remote connection device via the driver 47 and the appropriate net interfaces 45a or 45b.

The data transfer circuit 44 further receives data from the remote connection device via the net interfaces 45a and 45b and the receiver 48 and converts the data to a format that can be handled by the CPU 11b. The format-converted data is supplied to the CPU 11b through the host interface 27.

The data transfer circuit 44 supplies a signal S4 indicating the start of data transfer to the status control circuit 41 prior to the data transfer from the CPU 11b. The status control circuit 41 enables the local status generation circuit 42a, 42b to operate in response to the signal S4. The local status generation circuits 42a and 42b activate the local status signals ST1a and ST1b.

The data transfer circuit 44 also supplies the signal S4 to the status control circuit 41 in response to a receiving command from the CPU 11b. The status control circuit 41 enables the local status generation circuits 42a and 42b to operate in response to the signal S4. The local status generation circuits 42a and 42b activate the local status signals ST1a and ST1b.

The register 46 temporarily stores the status data from the CPU 11b. The status data is used to set the operation mode of the connection device 33. When the command for writing data to the register 46 by the CPU 11b and the status data are supplied, the data transfer circuit 44 stores the status data in the register 46.

The status data can be stored in the register 46 only while normal data transfer is not being performed among the personal computer 11, VCR 31, and printer 32. Accordingly, to store the status in the register 46, the connection device 33 must ignore interference from the network. Therefore, the data transfer circuit 44 supplies the signal S4 for ignoring interference from the network to the status control circuit 41. The status control circuit 41 disables the local status generation circuits 42a and 42b in response to the signal S4. Accordingly, the local status signals ST1a and ST1b are deactivated.

The remote connection device detects the inactivate remote status signals ST1a and ST1b (remote status signals). Accordingly, the remote connection device does not transfer data to the connection device 33. Thus, the status control circuit 41 deactivates the local status signals ST1a and ST1b in order to ignore interference from the network. Ignoring interference from the network may be performed in cases other than the storage of the status data in the register 46.

The operations of the connection devices 33 to 35 will now be described.

FIGS. 9(a) to (e) are diagrams explaining the operation of the connection devices 33 to 35. In FIG. 9, the personal computer 11, VCR 31, and printer 32 are omitted. In FIG. 9, the active status signal is shown by a solid line and the inactive status signal is shown by a dotted line. Further, the local status signal is shown as "L (local)" and the remote status signal is shown as "R (remote)".

Figure 9A:
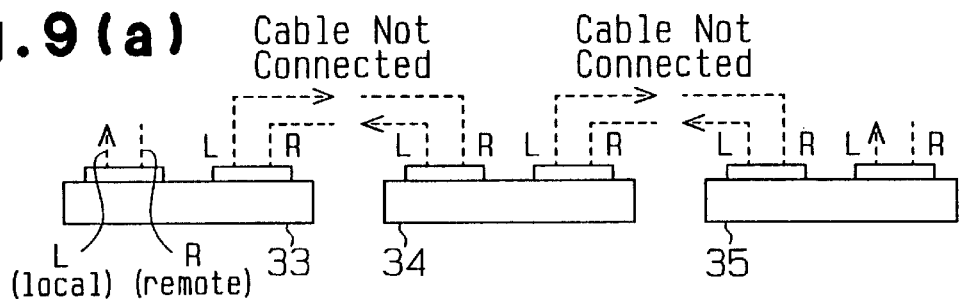
FIGS. 9(a) to 9(e) are diagrams explaining the operation of the connection device of FIG. 8.

In FIG. 9(a), the connection devices 33 to 35 are powered on and are in the non-connected state. At this time, the respective devices 33 to 35 do not detect the remote status signal and so the local status signal is maintained in the inactive state.

Figure 9B:
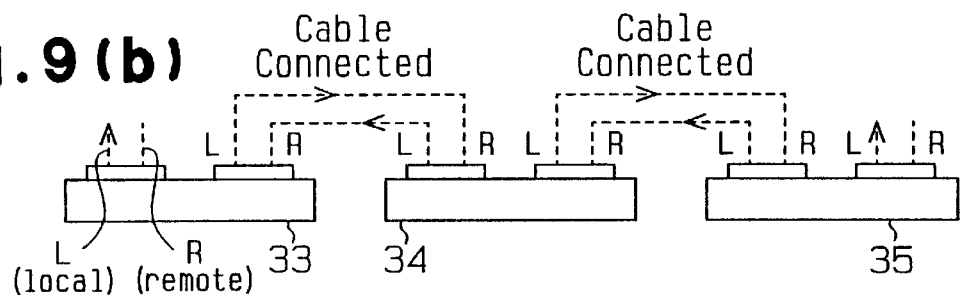

Then, as shown in FIG. 9(b), the connection devices 33 to 35 are connected. At this time, the respective devices 33 to 35 detect that the remote status signal is inactive and the local status signal is maintained in the inactive state.

Figure 9C:
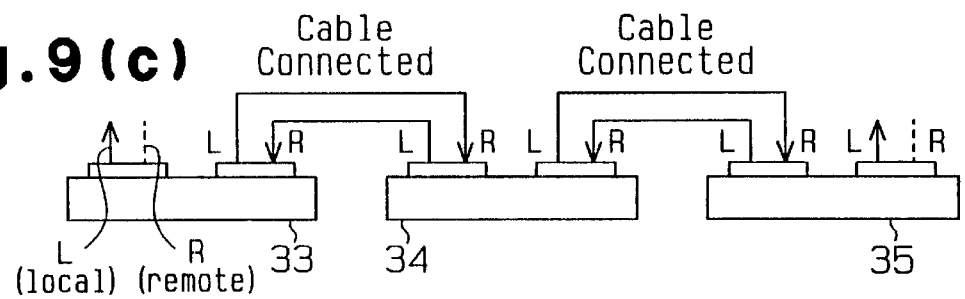

Next, in FIG. 9(c) data is transferred from the connection device 33 to the connection devices 34 and 35. In actuality, the data is transferred from the personal computer 11 to the VCR 31 through the connection devices 33 and 34 or data is transferred from the personal computer 11 to the printer 32 through the connection devices 33 to 35.

At this time, as shown in FIG. 9(c), the connection device 33 activates the local status signal. The connection device 34 receives the activated remote status signal and activates its local status signal. The connection devices 33 and 35 receive the activated local status signal (remote status signal) from the device 34. The connection device 35 activates its local status signal and supplies it to the connection device 34. Thus, the connection devices 33 and 35 detect the activated remote status signal. This completes the connection between the connection devices 33 and 35 and data is transferred from the connection device 33 to the connection devices 34 and 35. After the connection between the respective devices 33 and 35 is established, data is transferred from the connection devices 34 and 35 to the connection device 33.

Figure 9D:
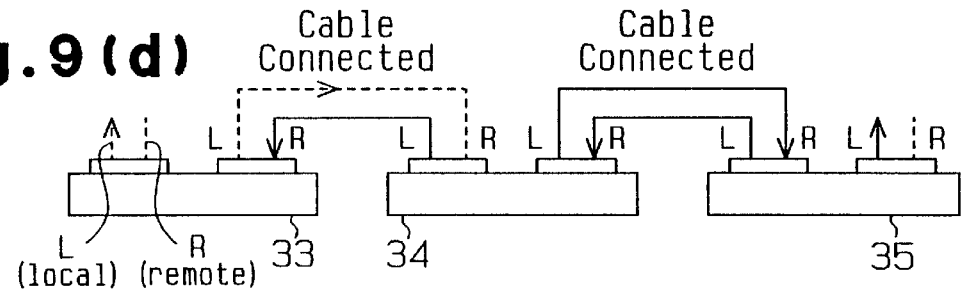

Subsequently, as shown in FIG. 9(d), when data is not being transferred, the connection device 33 deactivates its local status signal to prevent interference from the network. This reduces the power consumption of the connection device 33.

At this time, the connection device 34 detects that the remote status signal from the connection device 33 is inactive. However, since the connection device 34 receives the activated remote status signal from the connection device 35, the connection device 34 maintains its local status signal in the active state. Thus, the connection devices 33 and 34 are disconnected and the connection devices 34 and 35 are maintained in the connected state. Consequently, the network comprising the connection devices 34 and 35 is re-formed using the plug-and-play function.

Figure 9E:
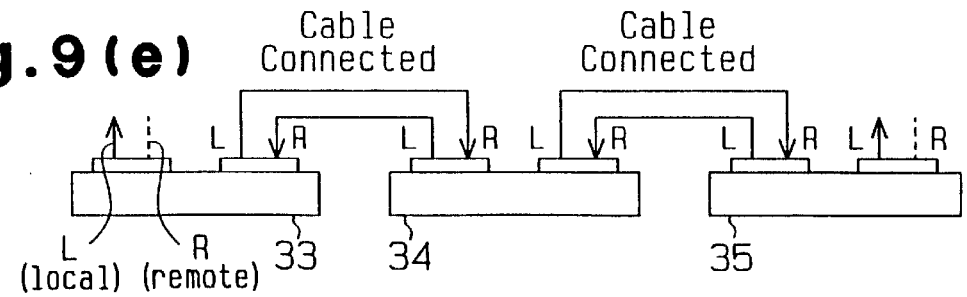

Subsequently, the connection device 33 activates its local status signal when it no longer desires to prevent interference from the network (FIG. 9(e)). The connection device 34 receives the activate remote status signal from the connection device 33 and recognizes the connection device 33. Accordingly, the connection devices 33 to 35 are reconnected. Thus, the network comprising the connection devices 33 to 35 is re-formed using the plug-and-play function.

As described above, the connection devices 33 to 35 that have been powered on complete the interconnection by activating the local status signal when data transfer starts after the cable 13 has been connected. Hence, the connection devices 33 to 35 implement plug-and-play and hot plug-in. Thus, the power consumption of the connection devices 33 to 35 is reduced until the data transfer starts.

Figure 10A:
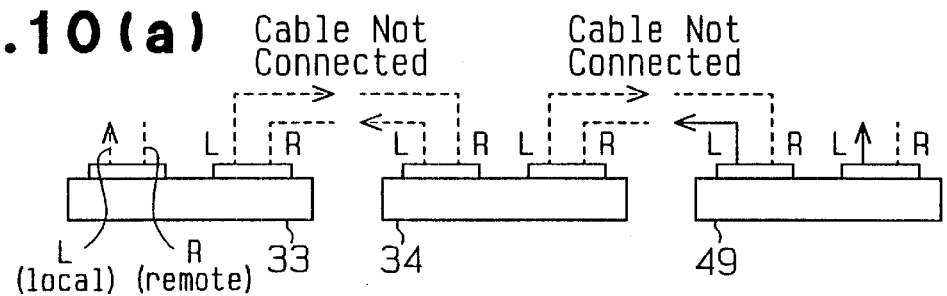
FIGS. 10(a) to 10(e) are diagrams explaining the operation of the connection device of FIG. 8.

FIGS. 10(a) to (e) are diagrams showing the operations of the connection devices 33 and 34 when a conventional connection device 49 is used. As shown in FIG. 10(a), the connection devices 33 and 34 and the conventional connection device (hereinafter referred to as conventional device) 49 are turned on and are in the non-connected state. At this time, the conventional device 49 always outputs the activate local status signal. The connection devices 33 and 34 do not detect that an active remote status signal and therefore maintain their own local status signal in the inactive state.

Figure 10B:
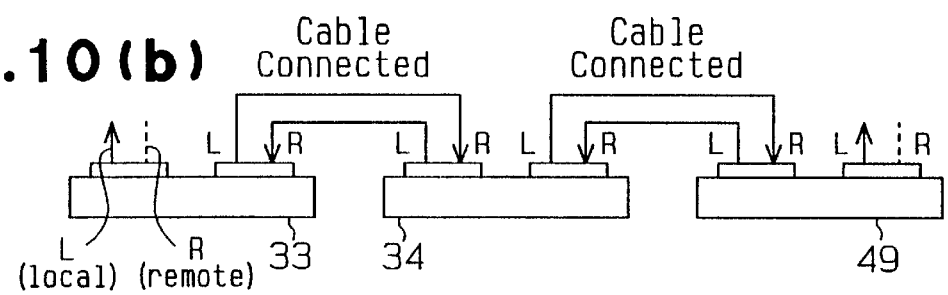

Then, as shown in FIG. 10(b), the connection devices 33 and 34 and the conventional device 49 are connected. Hereupon, the connection device 34 receives the activated remote status signal from the conventional device 49 and activates its local status signal. The conventional device 49 receives the activated remote status signal from the connection device 34.

The connection device 33 also receives the activate remote status signal from the connection device 34 and activates its local status signal. The connection device 34 receives the activate remote status signal from the connection device 33. Thus, the connection devices 33 and 34 and the conventional device 49 recognize the remote connection device by mutually detecting the activated remote status signals. This completes the connection of the respective devices 33, 34, and 49 and forms the network to enable data transfer.

Figure 10C:
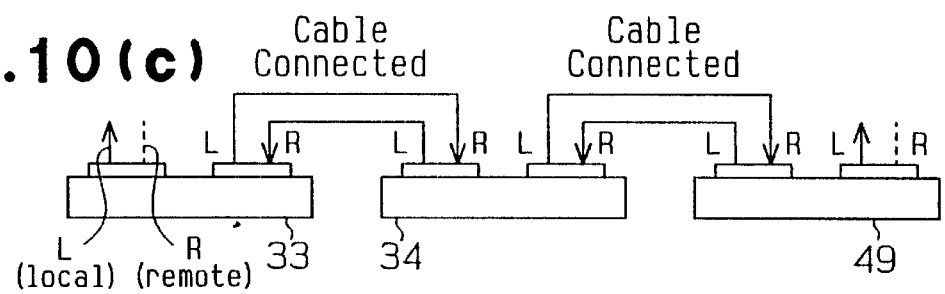

Subsequently, as shown in FIG. 10(c), because the connection devices 33 and 34 and the conventional device 49 recognize the device connection, data may be transferred between the devices 33, 34 and 49.

Figure 10D:
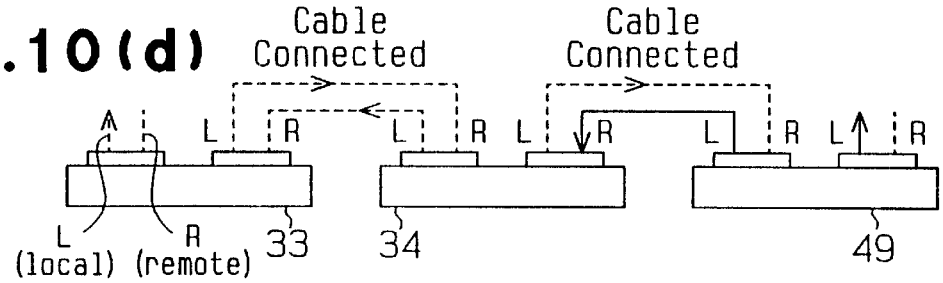

Then, as shown in FIG. 10(d), while data is not being transferred, the connection device 34 deactivates its local status signal to prevent interference from the network. The connection device 33 receives the inactive remote status signal from the connection device 34 and deactivates its local if status signal. Thus, the power consumption of the connection devices 33 and 34 is reduced.

Figure 10E:
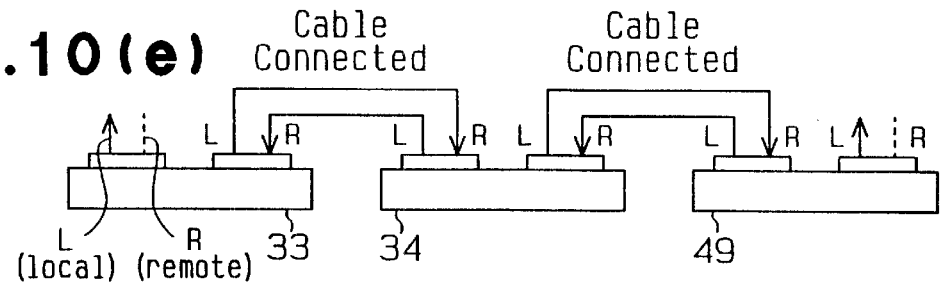

Subsequently, the connection device 34 activates its local status signal when it no longer desire to prevent interference from the network (FIG. 10(e)). The connection device 33 receives the activated remote status signal from the connection device 34 and recognizes the connection device 34 connected to the network. Accordingly, the connection device 49 receives the activated remote status signal from the connection device 34 and recognizes the connection device 34. Hence, the connection of the connection devices 33 and 34 and the conventional device 49 is resumed. Thus, the network comprising the connection devices 33 and 34 and the conventional device 49 is re-formed using the plug-and-play function.

As described above, according to the second embodiment, the following effects are shown.

(1) The status control circuit 41 disables the operation of the local status generation circuits 42a and 42b when the remote status signals ST2a and ST2b are deactivated. As a result, the power consumption of the local status generation circuits 42a and 42b is reduced.

(2) The status control circuit 41 enables the operation of the local status generation circuit 42a and 42b when it detects the activated remote status signal ST2a and ST2b. As a result, in the hot plug-in state, the remote connection device connected to the network is recognized and plug-and-play formation of the network is implemented.

In the second embodiment, the status control circuit 41 may also control the first and second ports 45a and 45b separately. The status control circuit 41 enables the corresponding local status generation circuits 42a or 42b to operate when the activated remote status signal ST2a or ST2b is detected in either of the ports. In this manner, when the remote connection device is connected to only one port, the power consumption of the local status generation circuit is reduced because operation of the local status generation circuit connected to the other port is disabled.

The present invention may also be embodied in a connection device equipped with three ports or more.

Third Embodiment

The connection device according to a third embodiment of the present invention is described below in accordance with FIGS. 11 and 12.

Figure 11:
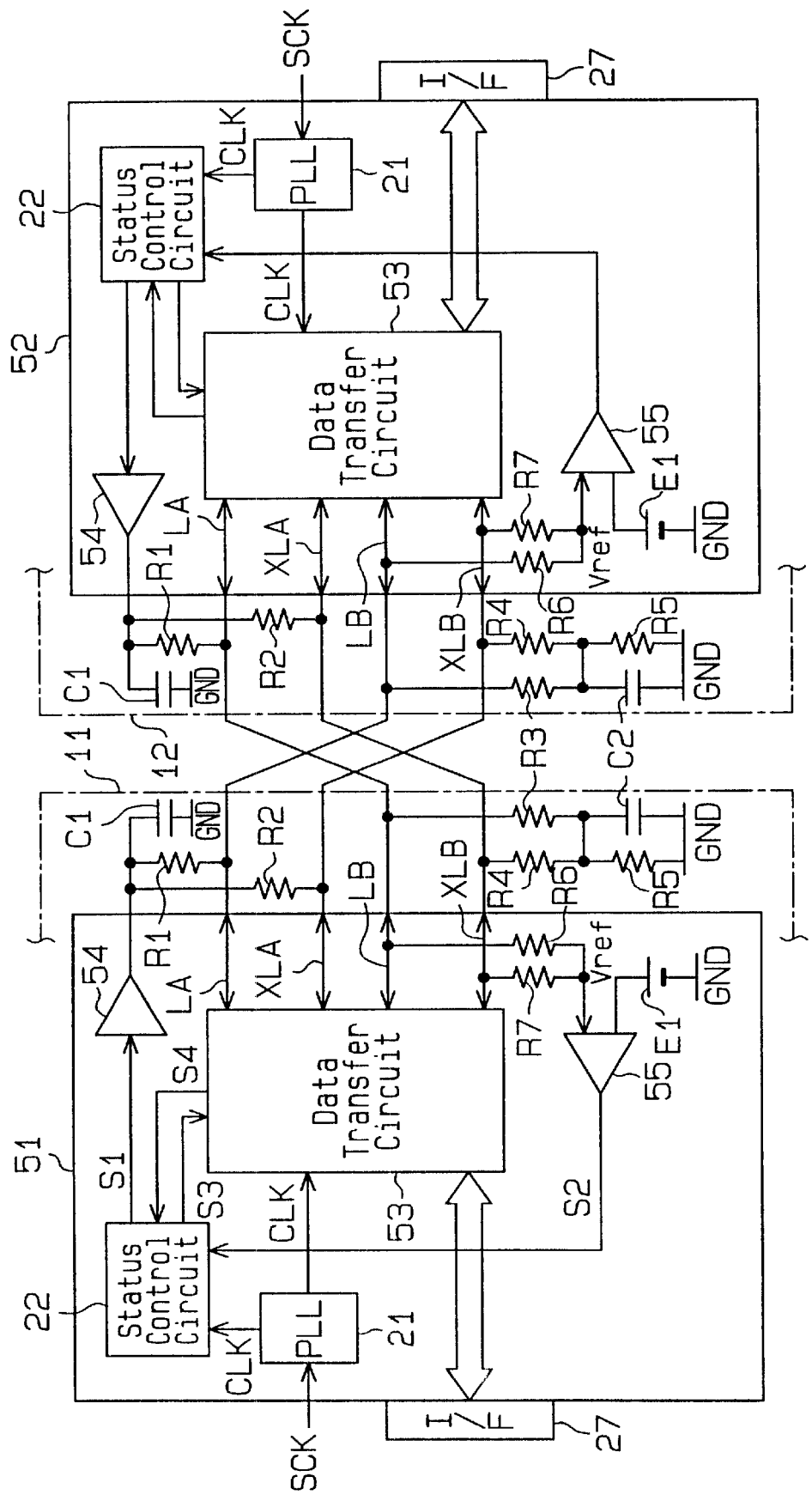
FIG. 11 is a schematic block diagram of a connection device according to a third embodiment of the present invention.

FIG. 11 is a schematic block circuit diagram of cable connection controllers (hereinafter referred to as connection devices) 51 and 52. The connection devices 51 and 52 may be provided in the personal computer 11 and the camera 12, respectively. Each of the personal computer 11 and the camera 12 includes terminating resistors R1 to R5 and capacitors C1 and C2.

Because the connection devices 51 and 52 have the same configuration, only the connection device 51 is described.

The connection device 51 includes the PLL circuit 21, the status control circuit 22, a data transfer circuit 53, a local status generation circuit 54, a remote status detection circuit 55, resistors R6 and R7, and a reference power supply E1.

The data transfer circuit 53 is connected to two signal line pairs LA and XLA, and LB and XLB. The first signal line pairs LA and XLA are connected to the second signal line pairs of the device 52, respectively, and second signal line pairs LB and XLB are connected to the first signal line pairs LA and XLA of the device 52, respectively.

The data transfer circuit 53 transfers data and strobe signals to the remote data transfer circuit 53 using the first signal line pairs LA and XLA and the second signal line pairs LB and XLB in accordance with a DS link method.

More particularly, the data transfer circuit 53 applies a potential difference exceeding a predetermined value to the first and second signal line pairs LA and XLA, and LB and XLB in accordance with the transfer data and strobe signals. For details, as shown in FIG. 12, the data transfer circuit 53 applies the low potential to the extent of the predetermined value from the signal line LA to the signal line XLA when the transfer data is "1" and applies the high potential to the extent of the predetermined value from the signal line LA to the signal line XLA when the data is "0".

The first signal line pairs LA and XLA are further connected to the output terminal of the local status generation circuit 54 via the resistors R1 and R2. The output of the local status generation circuit 54 is connected to a ground GND via the capacitor C1.

The second signal line LB is connected to the ground GND via the resistor R3 and the capacitor C2 and the second signal line XLB is connected to the ground GND via the resistors R4 and R5. The node between the resistor R3 and the capacitor C2 and the node between the resistors R4 and R5 are interconnected.

The remote status detection circuit 55 is a comparator having a first input terminal connected to the second signal line pairs LB and XLB via the resistors R6 and R7 having the same resistances, a second input terminal connected to the ground GND via the reference power supply E1, and an output terminal connected to the status control circuit 22.

The resistors R1 to R4 preferably have the same resistances and the resistors R6 and R7 have the same resistances. The relationships of the resistances of these resistors R1 to R7 are as follows.

Resistances of R6 and R7>>Resistances of R1 to R4,

Resistance of R5>>Resistances of R1 to R4, and

Resistances of R6 and R7>Resistance of R5

Specifically, the resistors R1 to R4 have resistances of 55 ohms, the resistor R5 has resistance of 5 k ohms, and the resistors R6 and R7 have resistances of 7 k ohms.

Figure 12:
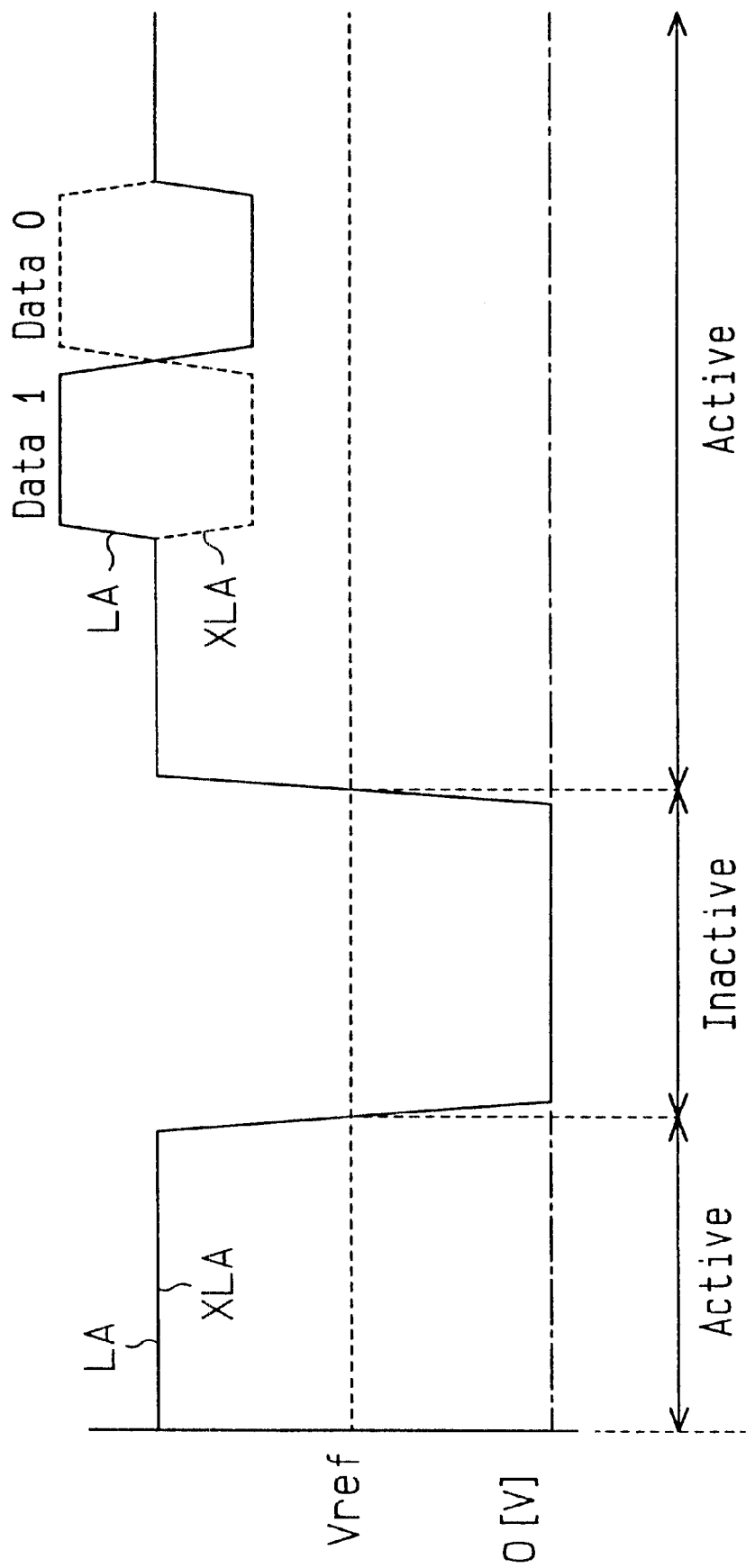
FIG. 12 is a waveform diagram of a status signal and transfer data generated by a data transfer circuit of the connection device of FIG. 11.

When the provision of the resistors R1 to R5 enables the local status generation circuit 54 to operate in response to the control signal S1 from the status control circuit 22, the local status generation circuit 54 applies the predetermined potential difference or offset voltage to the first signal line pairs LA and XLA and the second signal line pairs LB and XLB as shown in FIG. 12.

When the connection device 52 is connected to the connection device 51, the signal supplied to the connection device 52 via the second signal line pairs LB and XLB has a predetermined offset voltage. The remote status detection signal 55 of the connection device 51 detects the presence of the activated remote status signal in accordance with the offset voltage.

The average (average voltage) of the potentials of the second signal line pairs LB and XLB is applied to the first terminal of the remote status detection circuit 55 via the resistors R6 and R7 and a predetermined reference voltage Vref is applied to the second terminal from the reference power supply E1. As shown in FIG. 12, the remote status detection circuit 55 compares the average voltage and the reference voltage Vref and detects the activated remote status signal when the average voltage is higher than the reference voltage Vref. The status control circuit 22 supplies the activated control signal S1 to the local status generation circuit 54 in response to the detection signal S2 from the remote status detection circuit 55. As a result, operation of the local status generation circuit 54 is enabled.

The remote status detection circuit 55 detects that remote status signal is inactive and supplies the detection signal S2 to the status control circuit 22 when the average voltage is lower than the reference voltage Vref. The status control circuit 22 supplies the inactive control signal S1 to the local status generation circuit 54 in response to the detection signal S2. As a result, the local status generation circuit 54 is deactivated.

According to the third embodiment, the local status generation circuit 54 of the connection device 51 applies the predetermined offset voltage to the first signal line pairs LA and XLA when it is activated. The remote status detection circuit 55 detects the presence of the activated remote status signal by determining that the offset voltage is applied to the second signal line pairs LB and XLB. The status control circuit 22 deactivates the local status generation circuit 54 when the activated remote status signal is not detected. As a result, when the remote connection device is not connected and inactive, the power consumption of the local status generation circuit 54 is reduced.

Fourth Embodiment

Figure 13:
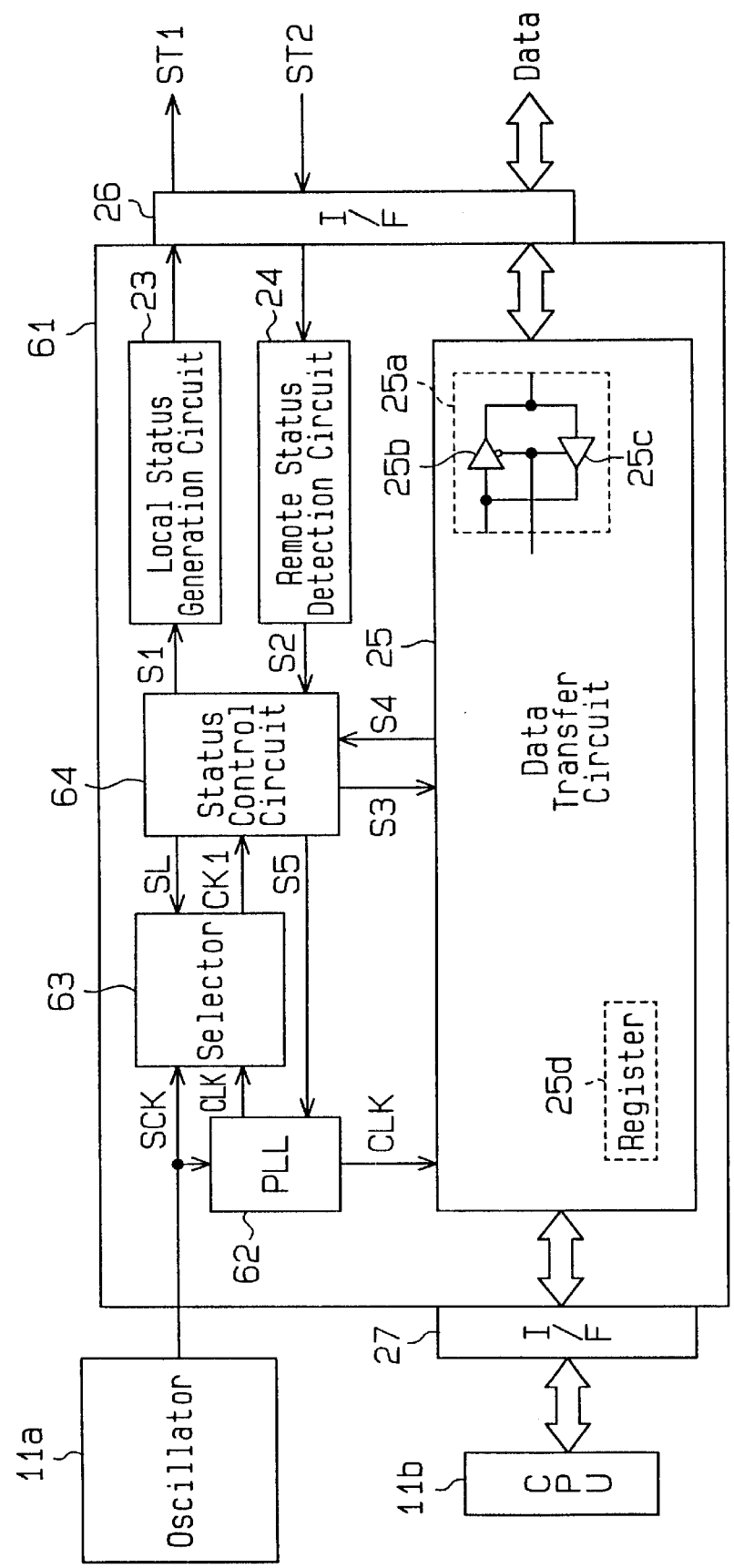
FIG. 13 is a schematic block diagram of the connection device according to a fourth embodiment of the present invention.

A connection device according to a fourth embodiment of the present invention is described in accordance with FIG. 13. FIG. 13 is a schematic block diagram of a cable connection controller (hereinafter referred to as connection device) 61.

The connection device 61 includes a PLL circuit 62, a selector 63, a status control circuit 64, the local status generation circuit 23, the remote status detection circuit 24, the data transfer circuit 25, the net interface 26, and the host interface 27. The PLL circuit 62 receives the reference clock signal CLK from the oscillator 11a and generates a clock signal CLK preferably having a higher frequency than that of the reference clock signal SCK. The data transfer circuit 25 operates in accordance with the clock signal CLK supplied from the PLL circuit 62.

The PLL circuit 62 receives a control signal S5 from the status control circuit 64 and enables or disables its operation in response to the control signal S5.

The selector 63 receives the reference clock signal SCK, the clock signal CLK from the PLL circuit 62, and a selection signal SL from the status control circuit 64 and selects either of the reference clock signal SCK and the clock signal CLK in accordance with the selection signal SL. The selection signal is supplied to the status control circuit 64 as a clock signal CK1.

The status control circuit 64 generates each of the activated control signal S1 and control signal S5 in response to the detection signal S2 indicating that the activated remote status signal ST2 is detected from the remote status detection circuit 24. The local status generation circuit 23 activates the local status signal ST1 in response to the activated status control signal S1. The PLL circuit 62 generates the clock signal CLK generated in response to the activated control signal S5.

The status control circuit 64 further deactivates the status control signal S1 and the clock control signal S5 in response to the detection signal S2 indicating that the remote status signal ST2 from the remote status detection circuit 24 is not active. The local status generation circuit 23 deactivates the local status signal ST1 in response to the inactive status control signal S1. The PLL circuit 62 stops the generation of the clock signal CLK in response to the inactive clock control signal S5.

The status control circuit 64 supplies the activated selection signal SL to the selector in response to the activated detection signal S2. The selector 63 selects the clock signal CLK in response to the selection signal SL and supplies the clock signal to the status control circuit 64 as a clock signal SK1.

The status control circuit 64 supplies the inactive selection signal SL to the selector 63 in response to the inactive detection signal S2. The selector 63 selects the reference clock signal SCK in response to the selection signal SL and supplies the reference clock signal SCK to the status control circuit 64 as the clock signal CK1.

As described above, the status control circuit 64 receives the clock signal CLK from the PLL circuit 62 when the local status signal ST1 is activated. The status control circuit 64 receives the reference clock signal SCK from the oscillator 11a when the local status signal ST1 is deactivated. The reference clock signal SCK has a lower frequency than that of the clock signal CLK. Accordingly, the operating speed of the status control circuit 64 that conforms to the reference clock signal SCK is slower than the operating speed that conforms to the clock signal CLK. Accordingly, the power consumption of the status control circuit 64 that operates in accordance with the reference clock signal SCK is lower than the power consumption when it operates in accordance with the clock signal CLK. The status control circuit 64 reduces the power consumption of the local status generation circuit 23 by deactivating the local status signal ST1 and reduces its power consumption.

When the local status signal ST1 is deactivated, the PLL circuit 62 stops the generation of the clock signal CLK. Accordingly, the data transfer circuit 25 stops operating. Hence, the power consumption of the data transfer circuit 25 is reduced. The stopped state of the PLL circuit 62 and the data transfer circuit 25 continues until the activated remote status signal ST2 is detected or the activation signal from the CPU 11b is supplied. The activation signal is supplied to the status control circuit 64 as the signal S4 from the CPU 11b via the wiring pattern provided in the host interface 27 and the data transfer circuit 25. The status control circuit 64 enables the operation of the local status generation circuit 23 and the PLL circuit 62 in response to the signal S4 and receives the clock signal CK1 from the PLL circuit 62 via the selector 63.

As described above, the status control circuit 64 disables the operation of the local status generation circuit 23 when the remote status signal ST2 is inactive and stops the PLL circuit 62. The status control circuit 64 further supplies the selection signal SL to the selector 63 and operates in accordance with the reference clock signal SCK having a lower frequency than that of the clock signal CLK. As a result, the status control circuit 64 operates at a low frequency. Accordingly, the power consumption of the local status generation circuit 23, PLL circuit 23, and status control circuit 64 is reduced.

In the fourth embodiment, the PLL circuit 62 may also reduce the frequency of the clock signal CLK in response to the control signal S5 from the status control circuit 64. In other words, the status control circuit 64 controls the PLL circuit 62 so that the frequency of the clock signal CLK will be reduced when it disables the operation of the local status generation circuit 23. This eliminates the need for the selector 63 and the selection signal SL.

Figure 14:
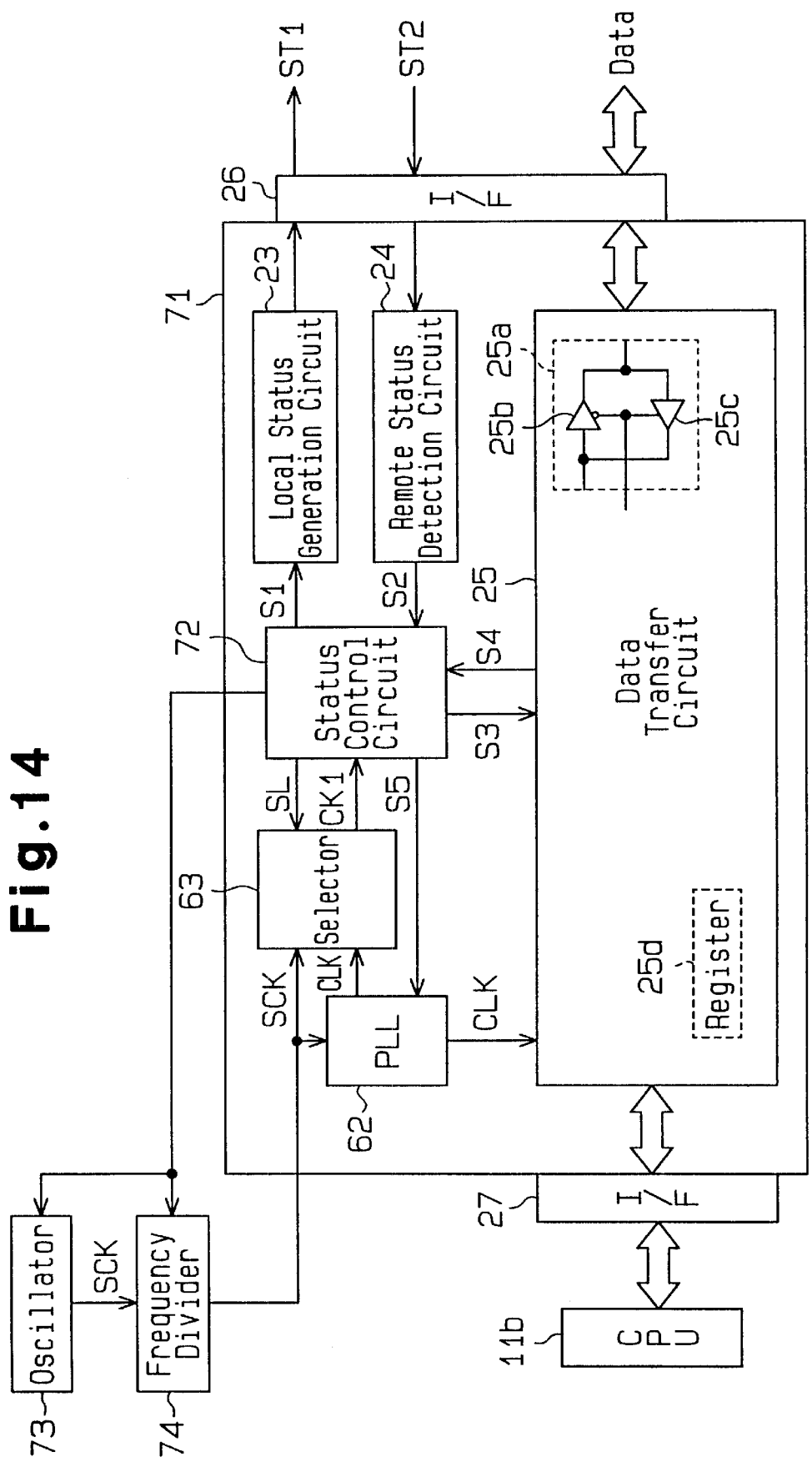
FIG. 14 is a schematic block diagram of a connection device according to a fifth embodiment of the present invention.

A fifth embodiment, which comprises a small modification of the fourth embodiment is shown in FIG. 14. A connection device 71 includes a status control circuit 72 receives the reference clock signal SCK via a frequency divider 74. The status control circuit 72 stops an oscillator 73 when it disables the operation of the local status generation circuit 23.

The status control circuit 72 may also control the operation of the oscillator 73 or the frequency division ratio of a frequency divider 74 so that the frequency of the clock signal will be lowered. In this case, the power consumption of the status control circuit 72 is reduced because it operates at a lower frequency than usual.

It should be apparent to those skilled in the art that the present invention may be embodied in many other specific forms without departing from the spirit or scope of the invention. Particularly, it should be understood that the invention may be embodied in the following forms.

The status control circuits 22, 41, 53, 64, and 72 may also disable the operation of the local status generation circuits 23, 42a, 42b, and 54 when the remote status signals ST2, ST2a, and ST2b are deactivated after the local status generation circuits 23, 42a, 42b, and 54 have been activated and a predetermined time period has elapsed.

The conditions in which the status control circuits 22, 41, 53, 64, and 72 enable the operation of the local status generation circuits 23, 42a, 42b, and 54 may optionally be increased. For example, when the driving power is supplied, operation of the local status generation circuits 23, 42a, 42b, and 54 may also be enabled.

According to the first embodiment, the status control circuit 22 activates the control signal S1 when the drive power (i.e. the power supply of the personal computer 11) of the connection device 14 is turned on. Operation of the local status generation circuit 23 is enabled by the activated control signal S1 and the local status generation circuit 23 supplies the activated local status signal ST1 to the remote connection device via the net interface 26.

According to the second embodiment, the status control circuit 41 activates the control signals S1a and S1b when the drive power of the connection device 33 is turned on. Operation of the local status generation circuits 42a and 42b is enabled by the activated control circuits S1a and S1b and the local status generation circuits 42a and 42b supply the activated local status signals ST1a and ST1b to the remote connection device via the net interfaces 45a and 45b.

According to the third embodiment, the status control circuit 22 activates the control signal S1 when the drive power of the connection devices 51 and 52 (i.e. the power supplies of the personal computer 11 and the camera 12) are turned on. Operation of the local status generation circuit 54 is enabled by the activated control signal S1, and the local status generation circuit 54 applies the predetermined offset voltage to the first signal line pairs LA and XLA, and supplies the activated local status signal to the remote connection device.

According to the fourth embodiment, the status control circuit 64 (72) activates the control signal S1 when the driving power of the control device 61 (71) is turned on. Operation of the local status generation circuit 23 is enabled by the activated control signal S1 and the local status generation circuit 23 supplies the activated local status signal ST1 to the remote connection device via the net interface 26.

Therefore, the present examples and embodiments are to be considered as illustrative and not restrictive and the invention is not to be limited to the details given herein, but may be modified within the scope and equivalence of the appended claims.

What is claimed is:

1. A connection control apparatus for controlling a connection between a local node and a remote node by sending and receiving a status signal therebetween, comprising:
   a status generation circuit generating a local status signal;
   a status detection circuit for receiving a remote status signal generated at the remote node and for detecting a state of the received remote status signal;
   a status control circuit, connected to the status generation circuit and the status detection circuit, for selectively controlling the status generation circuit, wherein the status control circuit disables the status generation circuit when the detected state of the remote status signal denotes deactivation and enables the status generation circuit when the local node starts sending data, the local node starts receiving data, or the detected state of the remote status signal denotes activation.

2. The apparatus of claim 1, wherein the status control circuit further enables the status generation circuit when the local node detects that it is connected to the remote node.

3. The apparatus of claim 1, wherein the status control circuit enables the status generation circuit in response to power-on in the local node.

4. The apparatus of claim 1, wherein the status control circuit disables the status generation circuit when the detected remote status signal denoting deactivation is detected after a predetermined time has elapsed from when the status generation circuit was enabled.

5. The apparatus of claim 1, wherein the status control circuit disables the status generation circuit in response to a request from the local node indicating that interference of the remote node has been ignored when the local node and the remote node are connected together.

6. The apparatus of claim 1, wherein the status control circuit disables the status generation circuit when the local node has not output any data for a predetermined period and when there has been no data transmission from the remote node during the predetermined period.

7. The apparatus of claim 1, wherein the status control circuit disables the status generation circuit in response to a request from the local node indicating that the connection with the remote node is disconnected.

8. The apparatus of claim 1, further comprising:
a PLL circuit, connected to the status control circuit, for receiving a reference clock signal and generating an internal clock signal having a predetermined frequency;
wherein the status control circuit disables the PLL circuit when the status generation circuit is disabled.

9. The apparatus of claim 8, wherein the status control circuit generates a selection signal, and
the connection control apparatus further comprising a selector, connected between the PLL circuit and the status control circuit, for receiving the reference clock signal, the internal clock signal, and the selection signal, and supplying one of the reference clock signal and the clock signal to the status control circuit in accordance with the selection signal.

10. The apparatus of claim 9, further comprising an oscillator, which generates the reference clock signal, and wherein the status control circuit generates a control signal for inhibiting the reference clock signal from the oscillator when the status generation circuit is deactivated.

11. The apparatus of claim 1, further comprising a PLL circuit, connected to the status control circuit, for receiving a reference clock signal and generating an internal clock signal having a predetermined frequency,
wherein the status control signal maintains the PLL circuit in an operating state when the status generation circuit is disabled.

12. The apparatus of claim 11, wherein the status control circuit controls the PLL circuit to reduce the internal clock frequency.

13. The apparatus of claim 12, further comprising an oscillator, which generates the reference clock signal, and wherein the status control circuit controls the oscillator so that the frequency of the reference clock signal is reduced when the status generation circuit is disabled.

14. The apparatus of claim 1, wherein the connection control apparatus is connected to a processing unit, and the status control circuit disables the processing unit when the status generation circuit is disabled.

15. The apparatus of claim 1, further comprising a plurality of ports, wherein a plurality of pairs of the status generation circuits and status detection circuits are connected to the plurality of ports, respectively; and
wherein the status control circuit enables the status generation circuits connected to all of the ports when at least one of the status detection circuits detects activation of the remote status signal.

16. The apparatus of claim 1, further comprising a plurality of ports, wherein a plurality of pairs of the status generation circuits and status detection circuits are connected to the plurality of ports, respectively; and
wherein, when the status detection circuit connected to any one of the ports detects activation of the remote status signal and the status detection circuits connected to the remaining ports detect deactivation of the remote status signal, the status control circuit disables the status generation circuit connected to the remaining ports.

17. The apparatus of claim 1, further comprising:
a driver for sending data from the local node; and
a receiver for receiving data from the remote node;
wherein the status control circuit disables the driver and the receiver when the status generation circuit is disabled.

18. The apparatus of claim 17,
wherein the status control circuit enables the driver and the receiver when the status generation circuit is enabled.

19. A method for controlling a connection between a local node and a remote node by sending and receiving a status signal therebetween, the local node and the remote node each being connected to a connection control apparatus, each connection apparatus including a status generation circuit for generating a local status signal and a status detection circuit for detecting a remote status signal generated by the status generation circuit of the connection controller of the remote node, the method comprising the steps of:
disabling the status generation circuit when deactivation of the remote status signal is detected by the status detection circuit; and
enabling the status generation circuit when the local node starts sending data, the local node starts receiving data, or when activation of the remote status signal is detected.

20. The method of claim 19, wherein the enabling step includes enabling the status generation circuit when the local node checks and determines that it is connected to the remote node.

21. The method of claim 19, wherein the enabling step includes enabling the status generation circuit in response to power-on in the local node.

22. The method of claim 19, wherein the disabling step includes disabling the status generation circuit when deactivation of the remote status signal is detected after a predetermined time has elapsed from when the status generation circuit is enabled.

23. The method of claim 19, wherein the disabling step includes disabling the status generation circuit in response to a request from the local node indicating that interference of the remote node has been ignored when the local node and the remote node are connected together.

24. The method of claim 19, wherein the disabling step includes disabling the status generation circuit when the local node has not output any data for a predetermined period and when there has been no data transmission from the remote node for the predetermined period.

25. The method of claim 19, wherein the disabling step includes disabling the status generation circuit in response to a request from the local node indicating that the remote node is disconnected from the local node.

26. The method of claim 19, wherein the connection control apparatus further includes a plurality of ports, and a plurality of pairs of the status generation circuits and status detection circuits are connected to the plurality of ports, respectively, and wherein the enabling step includes enabling the status generation circuits connected to all of ports when the status detection circuit connected to at least one of the ports detects activation of the remote status signal.

27. The method of claim 19, wherein the connection control apparatus further includes a plurality of ports, and a plurality of pairs of the status generation circuits and status detection circuits are connected to the plurality of ports, respectively, and wherein, when the status detection circuit connected to any one of the ports detects activation of the remote status signal and the status detection circuit connected to the remaining ports detect deactivation of the remote status signal, the disabling step includes disabling the status generation circuits connected to the remaining ports.

28. A connection device for connecting an electronic device to a remote device via a network, comprising:

a net interface circuit connected to a network for transmitting a local status signal over the network and for receiving a remote status signal transmitted over the network;

a local status generation circuit connected to the net interface circuit, the local status generation circuit generating the local status signal in response to a control signal;

a remote status detection circuit connected to the net interface circuit, the remote status detection circuit detecting a remote status signal received by the net interface circuit, wherein in response to detecting the remote status signal, the remote status detection circuit activates a detection signal;

a host interface circuit connected to the electronic device for passing data to the electronic device and for receiving data from the electronic device;

a data transfer circuit connected between the host interface circuit and the net interface circuit for passing data therebetween and for generating a data transfer control signal indicating that data is to be transferred between the remote device and the electronic device; and a status control circuit connected to the local status generation circuit for providing the control signal thereto, connected to the remote status detection circuit for receiving the remote status signal, and connected to the data transfer circuit for receiving a data transfer control signal therefrom, wherein the status control circuit activates the control signal in response to the data transfer control signal or the detection signal.

* * * * *